(12) United States Patent
Freienstein et al.

(10) Patent No.: US 9,457,753 B2
(45) Date of Patent: Oct. 4, 2016

(54) DEVICE AND VEHICLE WITH TILT COMPENSATION FOR AN ENVIRONMENT SENSOR

(71) Applicant: Robert Bosch GmbH, Stuttgart (DE)

(72) Inventors: Heiko Freienstein, Weil der Stadt (DE); Joerg Moennich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/443,771

(22) PCT Filed: Nov. 7, 2013

(86) PCT No.: PCT/EP2013/073273
§ 371 (c)(1),
(2) Date: May 19, 2015

(87) PCT Pub. No.: WO2014/079697
PCT Pub. Date: May 30, 2014

(65) Prior Publication Data
US 2015/0329072 A1 Nov. 19, 2015

(30) Foreign Application Priority Data

Nov. 20, 2012 (DE) .......................... 10 2012 221 188

(51) Int. Cl.
*B60R 21/0134* (2006.01)
*B62J 27/00* (2006.01)
(Continued)

(52) U.S. Cl.
CPC ............ *B60R 21/0134* (2013.01); *B62J 27/00* (2013.01); *B62J 99/00* (2013.01); *G01S 7/4026* (2013.01);
(Continued)

(58) Field of Classification Search
CPC .... G01S 13/86; G01S 17/023; G01S 15/025; G01S 7/4026; G01S 13/931; G01S 2013/9385; G01S 2007/4034; G01S 17/936; G01S 15/931; B62J 27/00; B62J 99/00; B62J 2099/002; B60R 21/0134; B62K 2207/02

USPC .......... 701/49, 90; 280/5.514, 6.157, 6.154; 180/219; 340/476
See application file for complete search history.

(56) References Cited

U.S. PATENT DOCUMENTS

| 2007/0222575 A1* | 9/2007 | Kawashima | ........... B62K 11/00 340/476 |
| 2009/0024350 A1* | 1/2009 | Suzuki | ..................... G01C 9/00 702/141 |
| 2010/0013186 A1* | 1/2010 | Markie | .................... B62H 1/06 280/297 |

FOREIGN PATENT DOCUMENTS

| DE | 199 06 208 A1 | 8/2000 |
| DE | 199 62 491 A1 | 7/2001 |

(Continued)

OTHER PUBLICATIONS

International Search Report corresponding to PCT Application No. PCT/EP2013/073273, mailed Feb. 5, 2014 (German and English language document) (5 pages).

*Primary Examiner* — Marthe Marc-Coleman
(74) *Attorney, Agent, or Firm* — Maginot, Moore & Beck LLP

(57) ABSTRACT

A device for a vehicle, particularly a motor vehicle, includes an environment sensor system which has at least one environment sensor for contactlessly detecting at least one environment region, means for adjusting the environment region to be detected, and a device for determining the environment region to be detected. The device has a position sensor which detects the tilting of the vehicle in respect of a vehicle base, and the means adjust the environment region to be detected depending on the tilt of the vehicle.

10 Claims, 3 Drawing Sheets

(51) Int. Cl.
    *B62J 99/00*     (2009.01)
    *G01S 17/02*     (2006.01)
    *G01S 15/02*     (2006.01)
    *G01S 7/40*     (2006.01)
    *G01S 13/86*     (2006.01)
    *G01S 15/93*     (2006.01)
    *G01S 17/93*     (2006.01)
    *G01S 13/93*     (2006.01)

(52) U.S. Cl.
    CPC .............. *G01S 13/86* (2013.01); *G01S 15/025* (2013.01); *G01S 17/023* (2013.01); *B62J 2099/002* (2013.01); *B62K 2207/02* (2013.01); *G01S 13/931* (2013.01); *G01S 15/931* (2013.01); *G01S 17/936* (2013.01); *G01S 2007/4034* (2013.01); *G01S 2013/9385* (2013.01)

(56) References Cited

FOREIGN PATENT DOCUMENTS

| | | |
|---|---|---|
| DE | 10 2005 024 052 A1 | 11/2006 |
| DE | 10 2011 075 062 A1 | 11/2012 |
| JP | 2008-110683 A | 5/2008 |

\* cited by examiner

DEVICE AND VEHICLE WITH TILT COMPENSATION FOR AN ENVIRONMENT SENSOR

This application is a 35 U.S.C. §371 National Stage Application of PCT/EP2013/073273, filed on Nov. 7, 2013, which claims the benefit of priority to Serial No. DE 10 2012 221 188.8, filed on Nov. 20, 2012 in Germany, the disclosures of which are incorporated herein by reference in their entirety.

The disclosure relates to a device for a vehicle, in particular a motor vehicle, having an environment sensor system which has at least one environment sensor for contactlessly sensing at least one environment region, having means for adjusting the environment region to be sensed, and having an apparatus for determining the environment region to be sensed. The means for adjusting the environment region to be sensed is also referred to herein as an adjustment system.

The disclosure also relates to a vehicle, in particular a motor vehicle, having a corresponding device.

BACKGROUND

Devices and vehicles of the type mentioned at the outset are known from the prior art. For example, the published patent application DE 10 2005 024 052 A1 discloses a device having an environment sensor system which has a plurality of environment sensors which are arranged beside one another on a fender of a motor vehicle in order to sense environment regions beside one another. In this case, the environment region to be sensed is determined on the basis of a steering angle of the motor vehicle. In order to determine the environment region to be sensed, the device therefore has an apparatus which senses the steering angle of the motor vehicle. As a result, the environment sensor system is oriented in the direction of the bend when cornering.

SUMMARY

The device according to the disclosure has the advantage that the sensed environment region is adapted independently of a steering angle of the vehicle. As a result, the environment region is also adapted when the vehicle is not cornering. The device can therefore also be sensibly used for environment region which are independent of a curved road. In particular, environment regions can be adapted to a longitudinal side of a vehicle on the basis of the lateral tilting of the vehicle, which is advantageous in two-wheeled vehicles, in particular. The device can also be advantageously provided in vehicles having a variable or changeable body in which the tilting of a body section, for example, can be changed with respect to an underlying surface on which the vehicle is being driven. The device according to the disclosure is distinguished by the fact that the apparatus has a position sensor which senses the tilting of the vehicle with respect to a vehicle underlying surface, and the means adjust the environment region to be sensed on the basis of the tilting of the vehicle. The position sensor makes it possible to easily sense the tilting of the vehicle, with the result that the means can readily determine the environment region to be sensed in a manner adapted to the tilting of the vehicle.

One advantageous development of the disclosure provides for the means to have an actuator device which pivots the at least one environment sensor on the basis of the tilting of the vehicle. For this purpose, the environment sensor is expediently mounted in a corresponding holder which can be actuated by the actuator device. The actuator device has at least one actuator, preferably a plurality of actuators which are in the form of electromagnetically, electromotively, hydraulically, mechanically and/or pneumatically operating actuators, for example. Pivoting of the sensor makes it possible to easily change the environment region sensed by the environment sensor or to adapt it to the tilting of the vehicle. Provision is preferably made for the means to adjust the environment region in such a manner that it substantially covers the environment as if the vehicle were not tilted with respect to the vehicle underlying surface. The environment sensor system is therefore designed in such a manner that it preferably always senses the environment at least substantially parallel to the road surface.

Another advantageous development of the disclosure provides for the environment sensor system to have at least two, preferably three, environment sensors which are arranged in order to sense environment regions lying on top of one another. The provision of a plurality of environment sensors dispenses with the need to pivot an environment sensor. The environment sensors are arranged on a vehicle longitudinal side, for example, in such a manner that they sense environment regions lying on top of one another to the side of the vehicle. In particular, the environment regions lying on top of one another lie on top of one another at a particular angle such that they form segments which are adjacent to one another or overlap one another in regions. Depending on the tilting of the vehicle to the side, one of the sensors is activated by the means in order to sense the respective environment region. In this case, the environment sensors are expediently oriented obliquely with respect to one another.

An alternative embodiment of the disclosure provides for the environment sensor system to have at least two, preferably three, environment sensors which are arranged in order to sense environment regions lying beside one another. In this case, the environment sensors are accordingly arranged in such a manner that they sense environment region lying beside one another or adjoining one another. In this case, the environment regions may overlap in regions or may adjoin one another without any overlapping or else may be at a distance from one another. In this case, the environment sensors are likewise preferably oriented obliquely with respect to one another in order to sense segment-shaped environment regions of an environment.

The means preferably have a control unit which operates one or more of the environment sensors on the basis of the tilting of the vehicle. The control unit activates the sensor which senses the desired environment region or accordingly controls the actuator device. The control unit preferably controls a plurality of sensors at the same time. The control unit preferably controls the plurality of sensors in such a manner that they jointly sense an environment region which can be changed on the basis of the control of the sensors. So-called beamforming, in particular with a phase shift of a radar antenna array, makes it possible to vary a radiation angle of the environment sensor system or of an environment sensor group having a plurality of environment sensors. If one or more environment sensors are provided, they are preferably pivoted individually or jointly as an alternative to the beamforming. In order to optimize the energy requirement, the control unit preferably controls only one of the sensors of the environment sensor system or environment sensor group in each case on the basis of the tilting angle.

One advantageous development of the disclosure provides for the at least one environment sensor to be in the form of a radar sensor, a lidar sensor, an ultrasonic sensor or a camera sensor or else a so-called time-of-flight sensor. The individual sensor types are known in principle and so shall not be discussed in any more detail at this juncture. They allow robust sensing of the environment in conjunction with the advantageous device.

One advantageous development of the disclosure provides for the position sensor to be in the form of an inertial sensor, a gyroscope sensor and/or an optical sensor, in particular a camera sensor. The sensing of the tilting of the vehicle, in particular a certain tilting angle of the vehicle with respect to the road surface, can be effectively determined with the aid of an inertial sensor or a gyroscope. The design of the position sensor as an optical sensor facilitates the sensing of the position, in particular when the road surface is not horizontal, but rather constitutes an incline, for example. The optical sensor, in particular the camera sensor, makes it possible to optically sense a horizon and to determine the position of the vehicle therefrom. The position sensor particularly preferably has a combination of said sensors, in which case a combination of the camera sensor with the inertial sensor or the gyroscope sensor is advantageous, in particular.

The vehicle according to the disclosure is distinguished by the device described above. It has the advantage that robust and interference-free sensing of the environment is ensured.

One advantageous development of the disclosure provides for the vehicle to be distinguished by the design as a two-wheeled vehicle, a tilting vehicle or a vehicle provided with a variable body, in particular with a variable wheelbase.

The vehicle preferably has the environment sensor system on at least one vehicle side, that is to say on at least one vehicle longitudinal side and/or on the front of the vehicle and/or on the rear of the vehicle. The environment sensor system is advantageously provided on a plurality of the vehicle sides, in particular with a respective environment sensor group, in which case the respective environment sensor group can be operated by a respective separate control unit or by a global control unit which is connected to all environment sensor groups.

BRIEF DESCRIPTION OF THE DRAWINGS

The disclosure shall be explained in more detail below using the drawing, in which.

DETAILED DESCRIPTION

Figure 1:
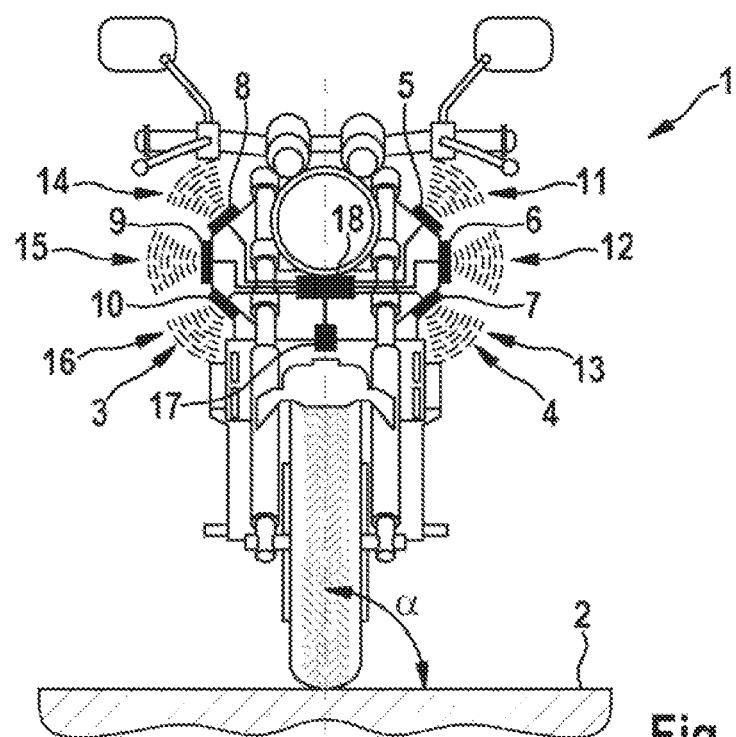
FIG. 1 shows a two-wheeled vehicle having an advantageous device for sensing the environment.

FIG. 1 shows a vehicle which is in the form of a two-wheeled vehicle 1 or in the form of a motorcycle. In the present case, the two-wheeled vehicle 1 is in an equilibrium position in which it is upright on an underlying surface 2 which can be driven on. The motorcycle has a device 3 which is, in particular, part of a safety apparatus of the two-wheeled vehicle 1 and has an environment sensor system 4 for contactlessly sensing the environment of the motorcycle. The environment sensor system 4 has six environment sensors 5 to 10 which are arranged on the vehicle longitudinal sides of the motorcycle. In this case, the environment sensors 5 to 7 are arranged on one side and the environment sensors 8 to 10 are arranged on the opposite vehicle longitudinal side. The environment sensors 5 to 10 may be in the form of radar sensors, lidar sensors, ultrasonic sensors or else optical sensors. The environment sensors 5 to 6 and 8 to 10 on one vehicle longitudinal side each form an environment sensor group.

The environment sensors 5 to 7 and 8 to 10 of the respective environment sensor group are oriented in this case obliquely with respect to one another such that their main axes are arranged at an angle of approximately 45° to one another, with the result that the environment regions 11 to 13 and 14 to 16 respectively sensed by the environment sensors 5 to 7 and 8 to 10 lie on top of one another. In this case, adjacent environment regions may overlap, may be at a distance from one another or may directly adjoin one another. In the present exemplary embodiment, the environment regions 11 to 13 and 14 to 16 adjoin one another. The environment sensors 5 to 10 are designed in this case in such a manner that the respectively sensed environment region 11 to 16 substantially has the form of a segment of a circle.

The device 3 also has a position sensor 17 which senses the position of the two-wheeled vehicle 1 with respect to the underlying surface 2 which can be driven on. In this case, the position sensor 17 determines a tilting angle α of the two-wheeled vehicle 1 with respect to the underlying surface 2 which can be driven on. In the present case, the tilting angle α is 90° (α=90°) on the basis of the balanced position of the two-wheeled vehicle 1. For this purpose, the position sensor is in the form of an inertial sensor, a gyroscope sensor or else an optical camera sensor, for example. The device 3 also has a control unit 18 which is operatively connected to the position sensor 17 and the environment sensors 5 to 10.

The device 3 is used to increase the safety of the driver of the two-wheeled vehicle 1, in particular in order to be able to automatically initiate measures which provide driving assistance, for example the display of warning signals, or safety measures, for example a braking operation, in an emergency.

For this purpose, the position sensor 17 always senses the position of the motorcycle and the underlying surface 2 which can be driven on, the control unit 18 controlling the environment sensors 5 to 10 on the basis of the sensed tilting α. In this case, the present exemplary embodiment provides for the environment sensors 6 and 9 to be activated in the embodiment according to FIG. 1 and in this respect to sense the environment regions 12 and 15 which are oriented substantially parallel to the vehicle underlying surface 2.

Figure 2:
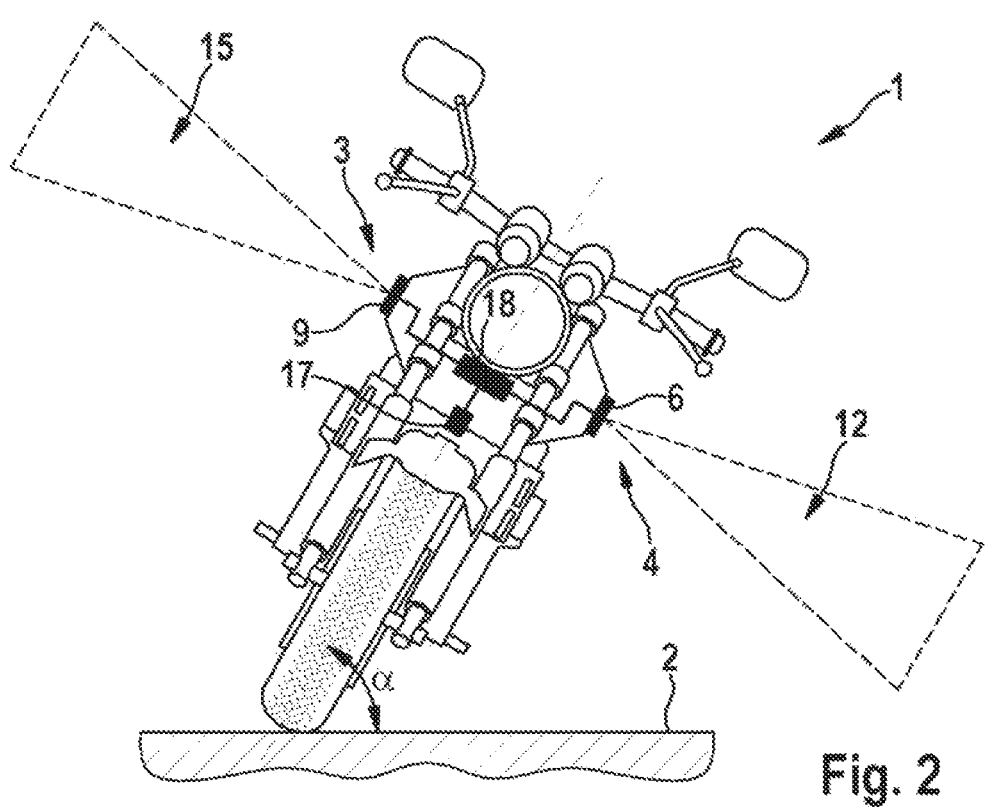
FIG. 2 shows the two-wheeled vehicle in a state tilted to the side.

If the two-wheeled vehicle 1 tilts to the side, as illustrated by way of example in FIG. 2, for example because the vehicle is going round a bend, the environment sensors 6 and 9 also tilt accordingly. This results in the environment regions 12 and 15 no longer being oriented parallel to the underlying surface 2 which can be driven on but rather being oriented in a manner tilted with respect to the latter. In particular, the environment sensor 6 now largely comprises the vehicle underlying surface 2, which results in a fault value. Objects which can be driven over are captured in the signal.

The control unit 18 advantageously controls the environment sensor system 4 in such a manner that, when a predefinable tilting angle α is undershot, as shown in FIG.

Figure 3:
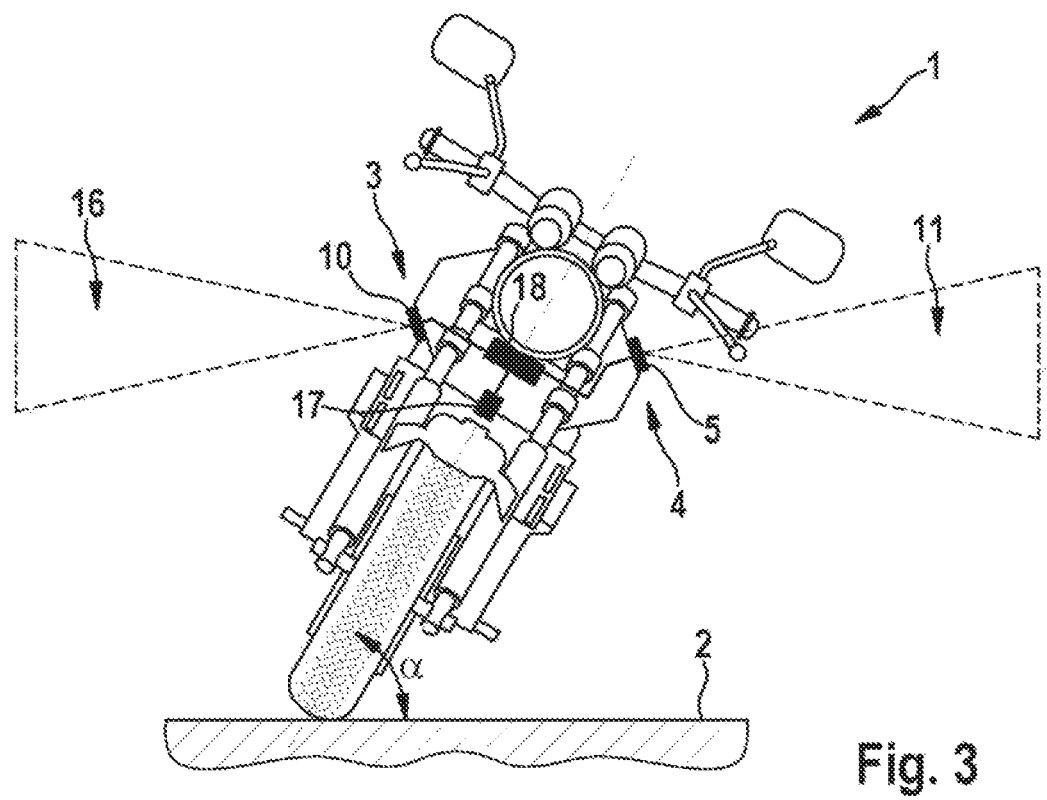
FIG. 3 shows the two-wheeled vehicle in the state tilted to the side with an adapted environment region of the device.

2, the environment sensors 5 and 10 are activated and the environment sensors 6 and 9 are deactivated. The environment regions 11 and 16 sensed thereby are then again substantially parallel to the road surface 2, as illustrated in FIG. 3. In this case, the tilting angle α is less than 90°. Nevertheless, the device 3 ensures that the environment of the motorcycle is reliably sensed. If the motorcycle is tilted in the opposite direction, with the result that the angle α is greater than 90°, the control unit 18 preferably controls the environment sensor system 4 in such a manner that only the sensors 7 and 8 are now activated and the environment regions 13 and 14 are thus sensed. The control unit 18 is therefore a means for adjusting the sensed environment region, whereas the position sensor forms an apparatus for determining the environment region to be sensed. An optimal environment region on both sides of the vehicle is therefore always sensed on the basis of the tilting of the vehicle 1.

As an alternative to the practice of changing over between the individual environment sensors 5 to 10, it is also conceivable to use beamforming to individually adapt the radiation characteristics of the environment sensor groups to the tilting angle of the vehicle 1. For this purpose, the respective environment sensor group is phase-shifted and a desired radiation angle of the respective environment sensor group is set by means of a distance-dependent signal delay.

Instead of a plurality of environment sensors for each longitudinal side of the vehicle 1, it is likewise conceivable to provide only one environment sensor in each case, for example environment sensors 6 and 9 which are mounted in a pivotable manner. A corresponding actuator system can then be used to pivot the environment sensors 6 and 9 in order to adapt the respectively sensed environment region 12, 15 to the tilting of the vehicle 1.

Figure 4:
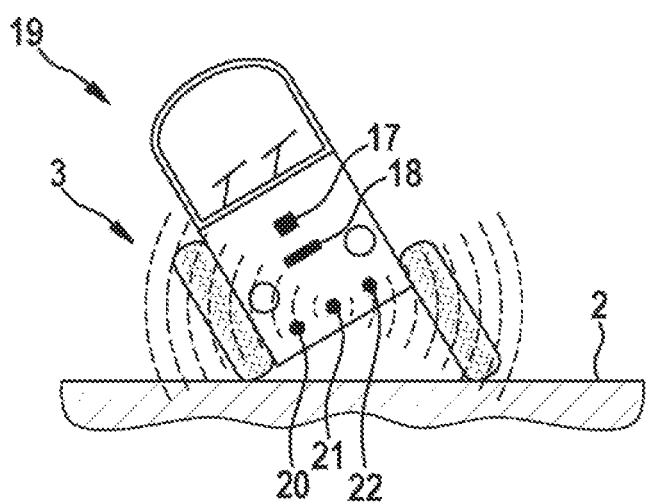
FIG. 4 shows a tilting vehicle having the device in the tilted state.

FIG. 4 shows another exemplary embodiment in which the vehicle is in the form of a tilting vehicle 19. In this case, the vehicle is in the form of a four-wheeled vehicle, in which case the height level of the wheels on one side of the vehicle can be changed with respect to those on the other side of the vehicle in order to "lean" the vehicle "into the bend" or to tilt the vehicle when cornering in order to increase the driving comfort. The tilting vehicle 19 likewise has the device 3, in which case, in this exemplary embodiment, an environment sensor group is provided on the front or front side of the tilting vehicle 19, which environment sensor group in the present case comprises three environment sensors 20, 21, 22 which are arranged beside one another. If the control unit 18 detects, by means of the position sensor 17, that the tilting vehicle 19 is tilted with respect to the underlying surface 2 which can be driven on, it controls the environment sensors 20 to 22 by means of beamforming in such a manner that the environment region sensed by the environment sensors 20 to 22 is moved in order to be parallel to the underlying surface 2 which can be driven on, as shown in FIG. 4 by means of curved lines. This avoids the environment region sensed by the environment sensors 20 to 22 being restricted by the vehicle underlying surface 2 and the environment sensors 20 to 22 sensing the vehicle underlying surface 2 and possibly incorrectly evaluating it as an obstacle.

Figure 5A:
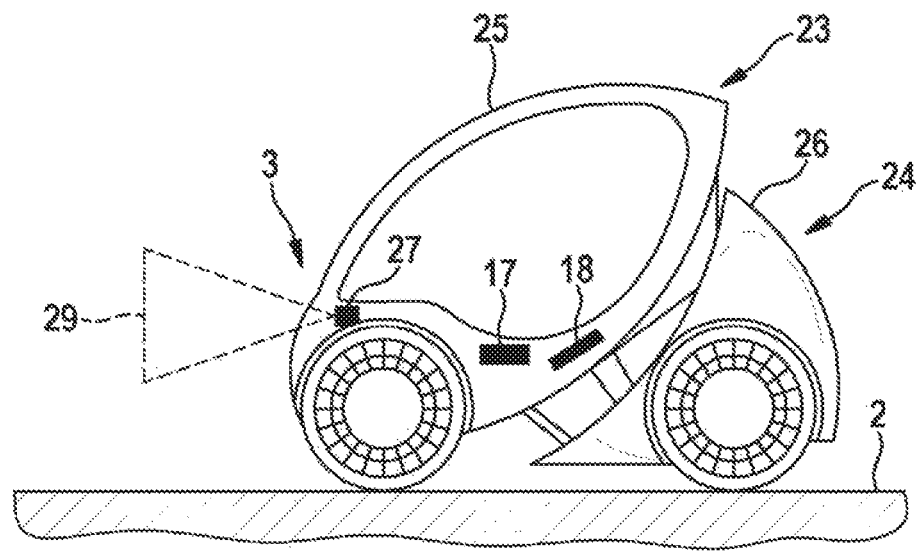
FIGS. 5A and 5B show a vehicle with a variable body and with the device in different body states.
Figure 5B:
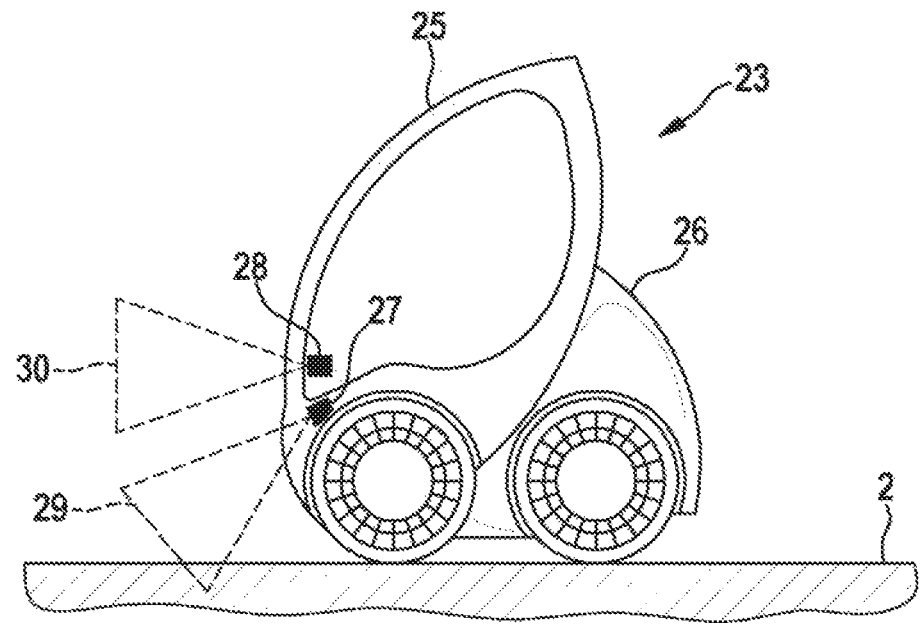

FIGS. 5A and 5B show another exemplary embodiment of the device 3, this time as part of a vehicle 23 having a variable body 24. The body allows the wheelbase to be changed, in which case a part 25 of the body 24 is tilted with respect to another part 26 for this purpose. In this respect, FIG. 5A shows the vehicle 23 in an initial state and FIG. 5B shows the vehicle 23 in a final state when the wheelbase has been minimized, each in a simplified side view.

In this case, the device 3 likewise has an environment sensor group which is arranged on the front side of the vehicle 25 and has at least two environment sensors 27, 28. In the initial state according to FIG. 5A, the environment sensor 27 is activated and senses a first environment region 29, the main axis of which is oriented parallel to the vehicle underlying surface 2.

The environment sensor 28 is oriented and arranged on the body 25 in such a manner that, when the vehicle 23 is in the final state, the main axis of the environment region sensed by the environment sensor 28 is oriented parallel to the road surface 2. If the body 24 is therefore accordingly moved from the initial state to the final state, the control unit 18 changes between the environment sensors 27 and 28, with the result that the environment sensor 28 is activated in the final state on the initial state the environment sensor 27 is activated. In this case, the tilting of the body part 25 may likewise be sensed using the position sensor 17.

Overall, the device 3 therefore ensures the optimum design of the environment sensing region and an energy saving since only the relevant environment sensor in each case is preferably controlled/activated. Changing between the environment sensors, as described above, prevents the road surface 2 itself being sensed, thus preventing disturbances and increasing the robustness of the system. Since fewer irrelevant objects are sensed, the computing power needed to evaluate the sensor signals is also reduced overall, with the result that the control unit 18 can be relatively cost-effective and simple.

The invention claimed is:

1. A device for a vehicle, comprising:
    an environment sensor system including at least one environment sensor configured to contactlessly sense at least one environment region;
    an apparatus configured to determine the at least one environment region to be sensed, the apparatus including a position sensor configured to sense tilting of the vehicle with respect to a vehicle underlying surface; and
    an adjustment system configured to adjust the at least one environment region to be sensed on the basis of the tilting of the vehicle.

2. The device as claimed in claim 1, wherein the adjustment system includes:
    an actuator device configured to pivot the at least one environment sensor on the basis of the tilting of the vehicle.

3. The device as claimed in claim 1, wherein the environment sensor system further includes:
    at least two environment sensors configured to sense environment regions lying on top of one another.

4. The device as claimed in claim 1, wherein the environment sensor system further includes:
    at least two environment sensors configured to sense environment regions lying beside one another.

5. The device as claimed in claim 1, wherein the adjustment system includes:
    a control unit configured to operate at least one of the environment sensors on the basis of the tilting of the vehicle.

6. The device as claimed in claim 1, wherein the at least one environment sensor includes:
    a radar sensor, a lidar sensor, an ultrasonic sensor, or a camera sensor.

7. The device as claimed in claim 1, wherein the position sensor includes:
   an inertial sensor, a gyroscope sensor, an optical sensor, or a camera sensor.

8. A vehicle comprising:
   a device including (i) an environment sensor system including at least one environment sensor configured to contactlessly sense at least one environment region, (ii) an apparatus configured to determine the at least one environment region to be sensed, the apparatus including a position sensor configured to sense tilting of the vehicle with respect to a vehicle underlying surface, and (iii) an adjustment system configured to adjust the at least one environment region to be sensed on the basis of the tilting of the vehicle.

9. The vehicle as claimed in claim 8, wherein the vehicle is a tilting vehicle or a vehicle with a variable body.

10. The vehicle as claimed in claim 8, wherein the environment sensor system is located on at least one side of the vehicle.

\* \* \* \* \*